Feb. 13, 1968    N. SION    3,368,387

DENSITY MEASURING INSTRUMENTS

Filed Dec. 8, 1964

INVENTOR
NICHOLAS SION

BY Kenyon, Palmer, Stewart & Estabrook

ATTORNEY

United States Patent Office 3,368,387
Patented Feb. 13, 1968

3,368,387
DENSITY MEASURING INSTRUMENTS
Nicholas Sion, Highgate, London, England, assignor to Ultra Electronics Limited, London, England, a British company
Filed Dec. 8, 1964, Ser. No. 416,696
4 Claims. (Cl. 73—32)

This invention relates to the continuous measurement of the density of a flowing liquid, such continuous measurement being desirable, for example, in the monitoring of the liquid fuel supply to an aircraft engine. In the case of an engine used in an aircraft where the fuel is subjected to rapid varying changes in temperature, pressure and the like it is important to distinguish between a quantity of fuel measured as a mass or as a volume: because of the variations in environment it is possible for a single quantitative measurement of volume of the fuel to have a plurality of significances in respect mass. By definition, the relationship between the mass and the volume is the density of the liquid.

This invention specifically relates to a liquid density metering which device is located in the engine fuel supply lines such that the fuel supply pumps cause the liquid, the density of which is to be measured to flow through the metering device. The said device is provided with an impeller to cause the liquid to flow in a vortex within the device. The pressure of the vortex deflects the plates of a capacitance to produce an output voltage. The vortex pressure at constant impeller speed is a direct function of the density of the liquid and the deflection of the capacitor plates: thus the output voltage is proportional to the density.

The following description relates to the drawings accompanying the provisional specification being a cross sectional diagram of the density measuring device.

Figure 1:
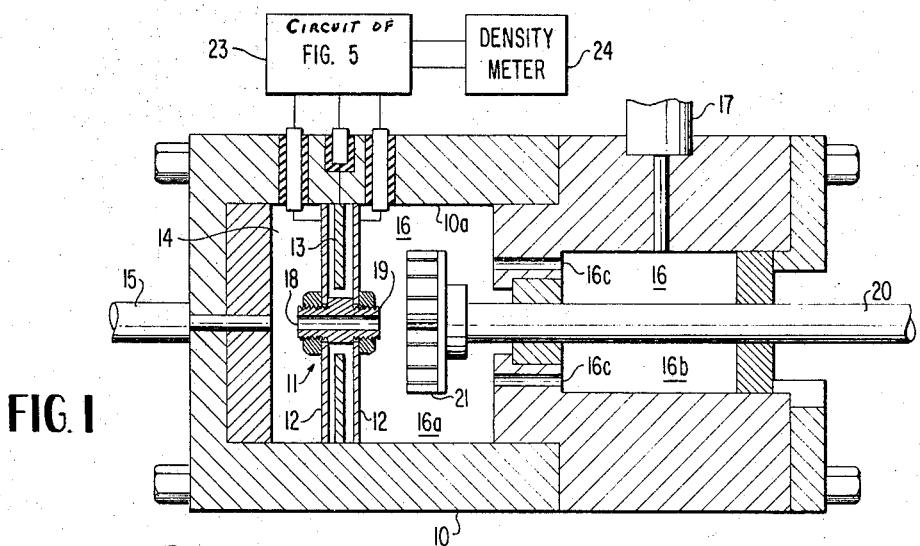
FIGURE 1 is a side view of the density measuring device and shows a variable capacitor and vortex creating impeller within a meter housing.
Figure 2:
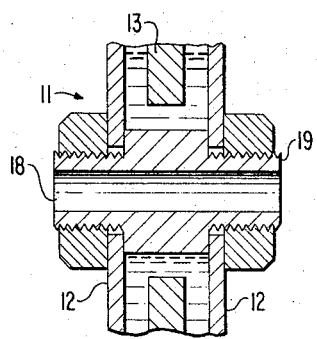
FIGURE 2 is an expanded view of a portion of the capacitor of FIGURE 1.
Figure 3:
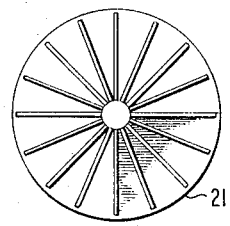
FIGURE 3 is a front view of the impeller of FIGURE 1.
Figure 4:
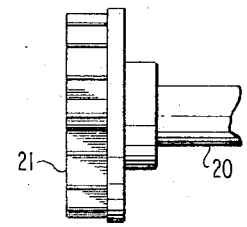
FIGURE 4 is a side view of the impeller of FIGURE 1.

In FIGURE 1, a tandem diaphragm arrangement 11 is shown supported in a housing 10 and comprising two pressure responsive diaphragms 12 arranged in parallel with each other, and rigidly fixed together for displacement as one, one on either side of a rigid centre plate 13 so that a capacitance exists between one diaphragm and the plate, and between the plate and the other diaphragm, these capacitances being therefore variable. As shown, the diaphragms and center plate are rigidly supported at their outer extremities by an inside wall 10a of the housing 10. On what may conveniently be called, the left-hand side of the diaphragm arrangement 11 is a chamber 14 into which opens a central fuel inlet passage 15. On the right-hand side of the diaphragm arrangement 11 is a cylindrical chamber 16 from which communicates with a fuel outlet passage 17 in the radial direction and at an appreciable distance axially from the diaphragm arrangement 11. In practice the chamber 16 comprises two sub-chambers 16a and 16b in fluid communication with each other through ports 16c. Communication between the two chambers 14 and 16 is through a central bore 18 in a central bolt 19 which fixes the two diaphragms 12 rigidly together. The pressure of liquid obtaining within chamber 16 is not a single determinate quantity, for a reason which will appear immediately.

Entering the cylindrical chamber 16 from its right-hand end is a power shaft 20, having a liquid-tight seal through the wall of the chamber. On the inner or left-hand end of this shaft 20 is an impeller 21 located centrally, immediately next to the bore 18 through which liquid fuel is arriving from chamber 14. Being rotated, this impeller 21 causes the liquid filling the chamber 16 to create a vortex within the chamber 16. The vortex pressure in chamber 16 is parabolic across the surface area of the diaphragm, so that there is a minimum pressure at the centre and maximum pressure at the perimeter of the vortex. Utilising this phenomenon, fuel is drawn in from chamber 14, through central bore 18, and is ejected at outlet 17 in the radial direction, thus allowing continuous sampling of the density of the liquid under investigation. Given constancy of speed of the impeller 21, then the axial pressure of the liquid on the diaphragms 12 is determined wholly by the density of that liquid. The axial pressure of the liquid upon the diaphragms 12 causes them to deflect. The diaphragm arrangement 11 is itself a variable capacitance pick-off; the overall capacitance between the diaphragms 12 and the rigid centre plate 13 is disturbed, and an output signal results, which is expressed as a voltage. Suitable leads are employed to operatively connect the capacitor 11 into a conventional measuring circuit 23 including the usual indicating device 24. A typical and conventional circuit for measuring the output signals of the capacitor is shown in FIGURE 5.

Figure 5:
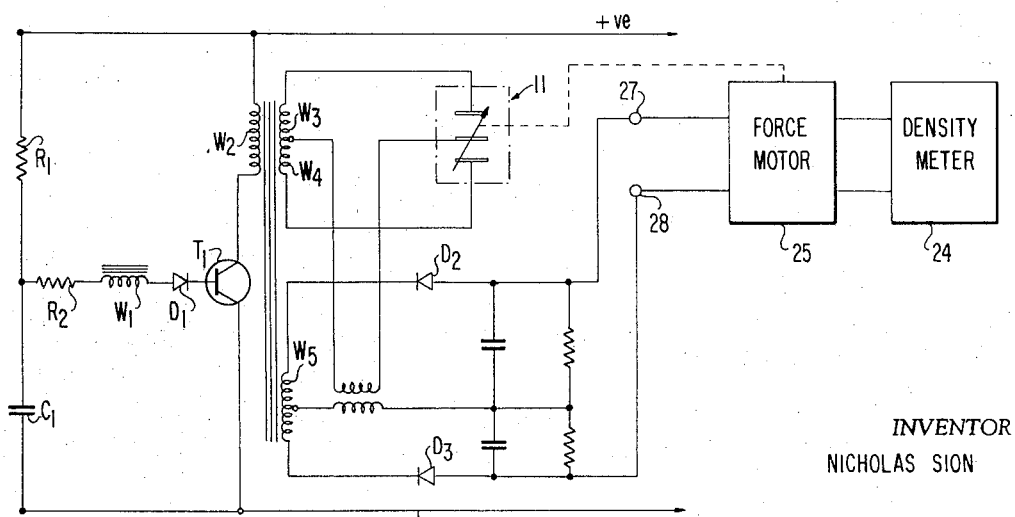
FIGURE 5 is a schematic diagram of a typical voltage measuring circuit employed with the apparatus of FIGURE 1.

As shown in FIGURE 5 a force motor 25 is used to force balance the instrument to obtain greater accuracy. Any output signal derived from the disturbed pick-off is amplified and fed into the force motor, which returns the diaphragm to the null position in the usual manner. A conventional metering device 24 can be connected to the force motor to measure the restoring current, or in the event a force motor is not employed the meter 24 can be connected directly to the output terminals 27 and 28.

Of course, although the foregoing description is expressed in terms of the liquid fuel for an aircraft jet engine, it is evident that the invention is by no means limited to that application: it can be utilized in any industrial process where continuous measurement of the density of a flowing liquid is desired.

What I claim is:

1. A densimeter for continuously measuring the density of a flowing liquid comprising:

a liquid-tight meter housing having a longitudinally extending chamber therein, and having longitudinally spaced liquid entrance and exit ports therein communicating with said chamber such that said liquid flows through said housing;

an impeller for creating a liquid vortex supported within said chamber between said entrance and exit ports by a powered impeller drive shaft;

a capacitor having at least one flexible plate and a spaced apart rigid plate supported within said chamber between said liquid entrance port and said impeller, the plates of said capacitor being fixed by their outer edge portions to the wall of said chamber, and said flexible plate being located between said impeller and said rigid plate and being displaced relative to said rigid plate in response to said vortex; and a measuring circuit electrically connected to said capacitor for indicating the density of said liquid.

2. A densimeter according to claim 1 wherein said flexible plate of said capacitor comprises a metal diaphragm and wherein said capacitor divides said chamber into a liquid receiving sub-chamber and a vortex sub-chamber, said capacitor being provided with a liquid port connecting said sub-chambers, said entrance port communicating with said receiving sub-chamber and said exit port communicating with said vortex sub-chamber; and wherein said impeller is supported and driven at constant speed within said vortex sub-chamber to thereby generate a liquid vortex, said metal diaphragm being responsive to the vortical pressure of said liquid vortex.

3. A densimeter according to claim 2 wherein said capacitor is provided with at least two flexible metal diaphragm plates disposed on opposite sides of said fixed plate, said flexible plates being rigidly attached to each other by a bolt having a passage therethrough for connecting said sub-chambers.

4. A densimeter according to claim 1 wherein said measuring circuit includes nulling means for returning said flexible plate to a null position.

References Cited

UNITED STATES PATENTS

| 2,080,429 | 5/1937 | McNally | 73—386 |
| 2,728,035 | 6/1952 | Meredith | 73—32 |
| 3,063,287 | 11/1962 | Hubbard | 73—30 |
| 3,164,017 | 1/1965 | Karlby et al. | 73—194 |

FOREIGN PATENTS 426,957   9/1924   Germany.

RICHARD C. QUEISSER, *Primary Examiner.*

J. J. GILL, *Examiner.*

J. D. SCHNEIDER, *Assistant Examiner.*